(12) United States Patent
Kim et al.

(10) Patent No.: US 9,226,635 B2
(45) Date of Patent: Jan. 5, 2016

(54) ROBOT CLEANER AND CONTROL METHOD THEREOF

(71) Applicant: SAMSUNG ELECTRONICS CO., LTD., Suwon-si, Gyeonggi-do (KR)

(72) Inventors: Shin Kim, Hwaseong-si (KR); Jeong Gon Song, Gwangju (KR); Ju Sang Lee, Gwangju (KR); Jun Pyo Hong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 134 days.

(21) Appl. No.: 14/049,715

(22) Filed: Oct. 9, 2013

(65) Prior Publication Data

US 2014/0100736 A1    Apr. 10, 2014

(30) Foreign Application Priority Data

Oct. 9, 2012    (KR) .......................... 10-2012-0111869

(51) Int. Cl.
| | |
|---|---|
| *G01C 22/00* | (2006.01) |
| *G05D 1/00* | (2006.01) |
| *A47L 11/40* | (2006.01) |
| *G05D 1/02* | (2006.01) |
| *B25J 9/00* | (2006.01) |

(52) U.S. Cl.
CPC ......... *A47L 11/4011* (2013.01); *A47L 11/4061* (2013.01); *B25J 9/0003* (2013.01); *G05D 1/0219* (2013.01)

(58) Field of Classification Search
CPC . G05D 1/0219; B25J 9/0003; A47L 11/4061; A47L 11/4011
USPC ............................................................ 701/26
See application file for complete search history.

(56) References Cited

U.S. PATENT DOCUMENTS

| | | | |
|---|---|---|---|
| 2005/0000543 A1* | 1/2005 | Taylor et al. .................... | 134/18 |
| 2006/0237037 A1* | 10/2006 | Kim ................................. | 134/18 |
| 2006/0293809 A1* | 12/2006 | Harwig et al. .................. | 701/23 |

FOREIGN PATENT DOCUMENTS

| | | |
|---|---|---|
| JP | 2002-204769 | 7/2002 |
| JP | 2003-135343 | 5/2003 |
| JP | 2009-64130 | 3/2009 |

* cited by examiner

*Primary Examiner* — Calvin Cheung
*Assistant Examiner* — Paula L Schneider
(74) *Attorney, Agent, or Firm* — Staas & Halsey LLP

(57) ABSTRACT

A control method of a robot cleaner for traveling to clean includes checking information about a predetermined traveling pattern; determining a traveling trajectory based on a traveling speed; generating a traveling pattern based on the determined traveling trajectory and the information about the predetermined traveling pattern, wherein the traveling pattern includes a first straight path, a first rotation path connected to the first straight path and for rotation in a first direction, a second straight path connected to the first rotation path, and a second rotation path connected to the second straight path and for rotation in a second direction; and repeatedly traveling along the generated traveling pattern at regular intervals. Therefore, since the robot cleaner performs cleaning without scattering dust, the efficiency of cleaning may be improved.

33 Claims, 18 Drawing Sheets

FIG. 7

| CELL1 | CELL2 | | | ROOM1 | ROOM2 |
|---|---|---|---|---|---|
| | | | | | |
| | | | | | |
| | | | | | ROOM3 |
| | | | | | |
| | | | | CELLn | | ved # ROBOT CLEANER AND CONTROL METHOD THEREOF

CROSS-REFERENCE TO RELATED APPLICATIONS

This application claims the benefit of Korean Patent Application No. 10-2012-0111869, filed on Oct. 9, 2012 in the Korean Intellectual Property Office, the disclosure of which is incorporated herein by reference.

BACKGROUND

1. Field

One or more embodiments relate to a robot cleaner for creating a pattern capable of enhancing the efficiency of cleaning, and a control method thereof.

2. Description of the Related Art

In general, a robot cleaner automatically cleans an area to be cleaned by sucking up foreign substances such as dust from a floor while autonomously traveling about the cleaning area without user manipulation.

During cleaning, the robot cleaner determines a distance to an obstacle, e.g., furniture, office appliances, walls, etc., present in the cleaning area using a sensor, and travels about the cleaning area without collision with the obstacle based on the determined distance.

Cleaning a given cleaning area using the robot cleaner means an operation in which the robot cleaner repeatedly travels about the cleaning area along a pre-set traveling pattern to clean the cleaning area, wherein the pre-set traveling pattern is, for example, a zig-zag pattern, a spiral pattern, a random pattern, etc.

The zig-zag pattern has been designed to repeatedly perform, in a predetermined area, operation of moving along a straight line, stopping at a direction-change point to rotate by 90° with respect to the moving direction, then moving along a straight line by a predetermined distance, again stopping to rotate by 90° in the opposite direction of the moving direction, and then moving along a straight line. After the robot cleaner travels all over the predetermined region in the zig-zag pattern, the robot cleaner repeatedly travels the same region to improve coverage.

The zig-zag pattern shows uniform cleaning coverage until cleaning is completed, but has lower coverage than the random pattern if there is no repeated traveling.

Also, the zig-zag pattern requires two stops and two rotations to change the travel direction, and needs a long time for direction change since an acceleration/deceleration velocity profile is applied for stops and rotations.

Furthermore, upon stops and rotations for direction change during cleaning based on the zig-zag pattern, the robot cleaner tends to spill collected dust. Particularly, in the case of wet cleaning, the robot cleaner may spill a large quantity of dust at direction-change points since it wipes off dust with a rag instead of sucking dust up.

In addition, the robot cleaner has a problem that dust is gathered between a main brush and a blade made of a soft material, the blade installed in a reverse-inclined direction in the back of the brush. Particularly, a blade made with the soft material often tilts back when the robot cleaner moves, which widens the distance from the main brush.

SUMMARY

The foregoing described problems may be overcome and/or other aspects may be achieved by one or more embodiments of a robot cleaner for performing cleaning in a pattern capable of minimalizing the number of stops, and a method for controlling the robot cleaner.

The foregoing described problems may be overcome and/or other aspects may be achieved by one or more embodiments of a robot cleaner for preventing dust from spilling out by reverse-traveling during cleaning, and a method for controlling the robot cleaner.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments relate to a robot cleaner that may include a main body; a traveling unit that may move the main body; and a controller that may control the traveling unit such that the robot cleaner may travel from a first straight path to a first rotation path and from the first rotation path to a second straight path intersecting the first straight path.

The controller may control the traveling unit such that the robot cleaner may travel from the second straight path to a second rotation path having a rotation direction opposite to the rotation direction of the first rotation path, and from the second rotation path to the first straight path intersecting the second straight path.

The controller may control the traveling unit such that the robot cleaner may repeatedly travel along a traveling pattern in which the first straight path, the first rotation path, the second straight path, and the second rotation path are sequentially connected to each other.

The robot cleaner may further include: an input unit that may receive a selection of a cleaning mode among a plurality of cleaning modes; and a storage unit that may store size information about traveling patterns respectively corresponding to the plurality of cleaning modes, wherein the controller may check size information about a traveling pattern corresponding to the selected cleaning mode, may generate the traveling pattern based on the size information about the traveling pattern, and may control driving of the traveling unit based on the generated traveling pattern.

The size information about the traveling pattern may include a pattern length of the traveling pattern, and a pitch length between pitch points of neighboring traveling patterns.

The robot cleaner may further include an obstacle detector that may detect an obstacle, wherein the controller may determine a distance to the obstacle based on an obstacle detection signal, and may regenerate a traveling pattern based on the determined distance to the obstacle.

The controller may measure a traveling distance when the robot cleaner repeatedly travels along the traveling pattern, compare the measured traveling distance to a first distance, and control the traveling unit to reverse the robot cleaner by a second distance if the measured traveling distance has reached the first distance.

The robot cleaner may further include: a brush unit that may sweep dust off; and a torque detector that may detect a torque applied to the brush, wherein the controller may control the traveling unit to reverse the robot cleaner by a predetermined distance based on the detected torque.

The robot cleaner may further include: a main brush installed in the brush unit; and a blade positioned at a predetermined angle with respect to a rotating shaft of the main brush.

One or more embodiments relate to a robot cleaner that may include a main body; a traveling unit that may move the main body; and a controller that may control the traveling unit such that the robot cleaner may travel along a traveling pattern that may include a first straight path extending in a first direction, and a second straight path extending in a second direction making a first angle with the first straight path.

Neighboring traveling patterns may make a first angle with each other.

The controller may control the traveling unit such that the robot cleaner may repeatedly travel about a cell along the traveling pattern, in such a manner to rotate the traveling unit to a second angle at a point at which first traveling has been completed to straightly move the robot cleaner by a predetermined distance in an opposite direction, and then to perform second traveling along the traveling pattern.

The robot cleaner may further include: an input unit that may receive a selection of a cleaning mode among a plurality of cleaning modes; and a storage unit that may store size information about traveling patterns respectively corresponding to the plurality of cleaning modes, wherein the controller may check size information about a traveling pattern corresponding to the selected cleaning mode, may generate a traveling pattern based on the size information about the traveling pattern, and may control driving of the traveling unit based on the generated traveling pattern.

The size information about the traveling pattern may include a pattern length of the traveling pattern, and a pitch length between pitch points of neighboring traveling patterns.

The robot cleaner may further include an obstacle detector that may detect an obstacle, wherein the controller may determine a distance to the obstacle based on an obstacle detection signal, and may regenerate a traveling pattern based on the determined distance to the obstacle.

The controller may measure a traveling distance when the robot cleaner repeatedly travels along the traveling pattern, compare the measured traveling distance to a first distance, and control the traveling unit to reverse the robot cleaner by a second distance if the measured traveling distance has reached the first distance.

The robot cleaner may further include: a brush unit that may sweep dust off; and a torque detector that may detect a torque applied to the brush, wherein the controller may control the traveling unit to reverse the robot cleaner by a predetermined distance based on the detected torque.

One or more embodiments relate to a robot cleaner that may include a main body; a traveling unit that may move the main body; and a controller that may control the traveling unit such that the robot cleaner may repeatedly travel along "figure 8"-shaped traveling patterns successively arranged at regular intervals.

One or more embodiments relate to a control method of a robot cleaner for traveling to clean that may include checking information about a predetermined traveling pattern; determining a traveling trajectory based on a traveling speed; generating a traveling pattern based on the determined traveling trajectory and the information about the predetermined traveling pattern, wherein the traveling pattern may include a first straight path, a first rotation path connected to the first straight path, and a second straight path connected to the first rotation path and intersecting the first straight path; and traveling along the generated traveling pattern.

The generating of the traveling pattern may further include generating a second rotation path connected to the second straight path and having a rotation direction opposite to the rotation direction of the first rotation path, and a next first straight path connected to the second rotation path.

The traveling along the generated traveling pattern may include repeatedly traveling along a traveling pattern in which the first straight path, the first rotation path, the second straight path, and the second rotation path are sequentially connected to each other.

The control method may further include: detecting an obstacle; and determining a distance to the obstacle if the obstacle is detected, and regenerating a traveling pattern based to the determined distance to the obstacle.

The regenerating of the traveling pattern may include generating a rotation path before collision with the obstacle.

The generating of the traveling pattern may further include: checking a cleaning mode selected through an input unit; checking size information about a traveling pattern corresponding to the selected cleaning mode; and generating the traveling pattern based on the size information about the traveling pattern.

The control method may further include: measuring a traveling distance; comparing the traveling distance to a first distance; and reversing the robot cleaner by a second distance if the measured traveling distance has reached the first distance.

The control method may further include: detecting a torque applied to a brush unit; and reversing the robot cleaner by a predetermined distance based on the detected torque.

One or more embodiments relate to a control method of a robot cleaner for traveling to clean that may include checking information about a predetermined traveling pattern; determining a traveling trajectory based on a traveling speed; generating a traveling pattern based on the determined traveling trajectory and the information about the predetermined traveling pattern, wherein the traveling pattern may include a first straight path extending in a first direction and a second straight path extending in a second direction making a first angle with the first straight path; and repeatedly traveling along the generated traveling pattern at regular intervals while maintaining the first angle between two traveling patterns.

The control method may further include: performing first traveling of repeatedly traveling about a cell along the traveling pattern; rotating the robot cleaner to a second angle at a point at which the first traveling has been completed, and straightly moving the robot cleaner by a predetermined distance in an opposite direction of the traveling direction; and performing second traveling of traveling about the cell along the traveling pattern, starting from a point at which the straight moving has been completed.

The generating of the traveling pattern may further include: checking a cleaning mode selected through an input unit; and adjusting at least one of a pattern length and a pitch length based on pattern information corresponding to the selected cleaning mode.

The generating of the traveling pattern may further include: detecting an obstacle; and determining a distance to the obstacle if the obstacle is detected to adjust a pattern length of the traveling pattern.

Therefore, since the robot cleaner may perform cleaning without scattering dust, the efficiency of cleaning may be improved. Particularly, in the case of wet cleaning, the robot cleaner may perform cleaning while driving dust without scattering the dust.

Also, by reducing the number of stops when the traveling direction of the robot cleaner changes during cleaning, it may be possible to reduce the time consumed for cleaning, thereby possibly improving an initial coverage rate, possibly resulting in improvement of user satisfaction.

In addition, by removing dust remaining between the blade and the main brush, it may be possible to prevent the elements of the robot cleaner from being damaged.

BRIEF DESCRIPTION OF THE DRAWINGS

These and/or other aspects will become apparent and more readily appreciated from the following description of embodiments, taken in conjunction with the accompanying drawings of which:

FIG. 7 illustrates a plurality of cells of an area to be cleaned, divided by the robot cleaner according to one or more embodiments;

DETAILED DESCRIPTION

Figure 1:
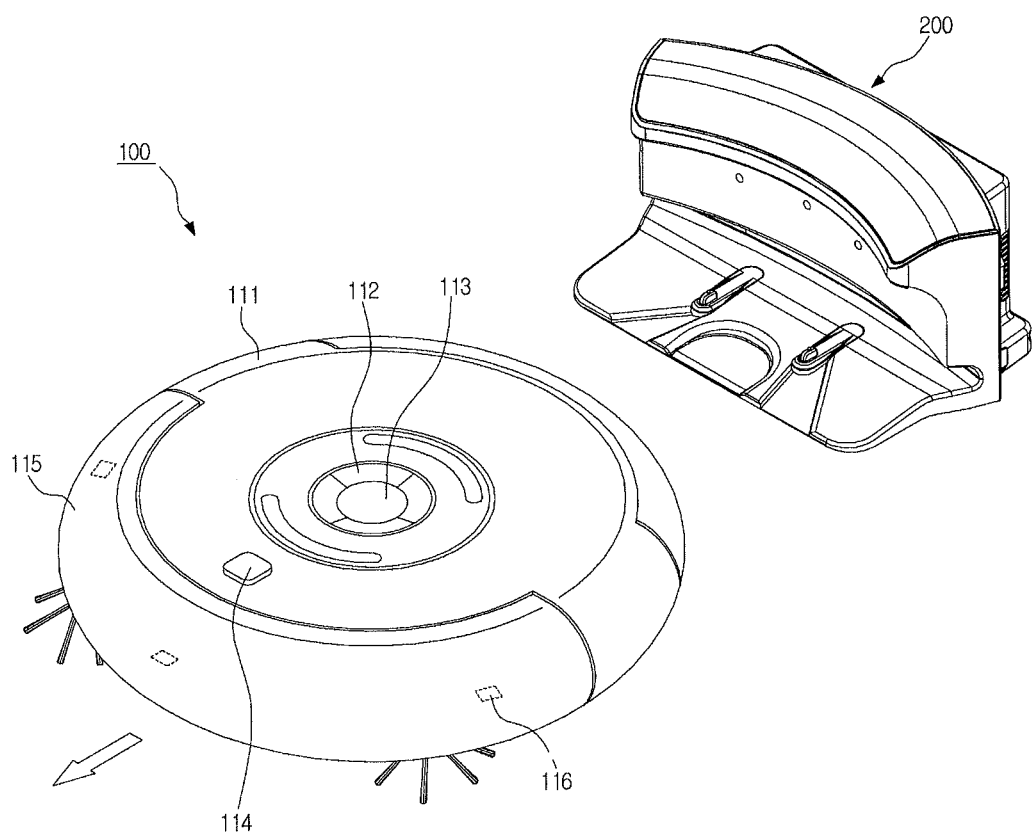
FIGS. 1, 2, and 3 illustrate a robot cleaner according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 2:
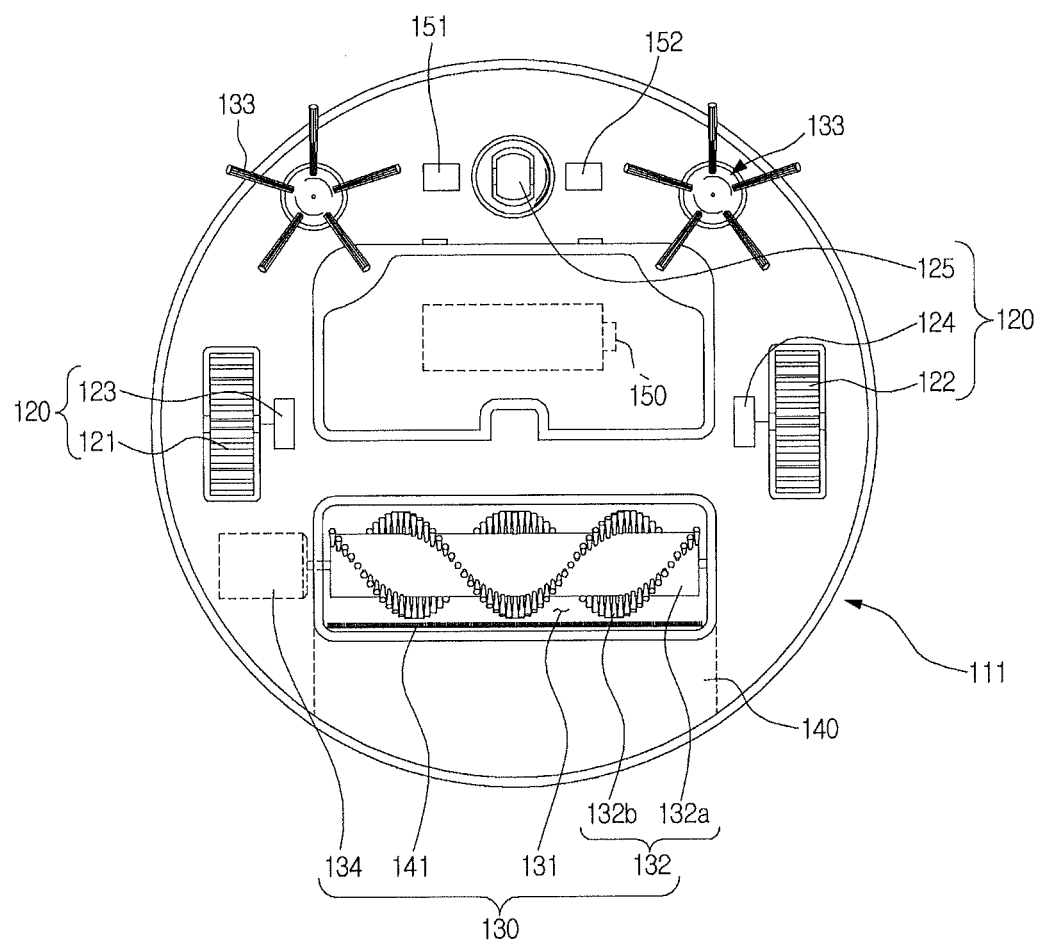
Figure 3:
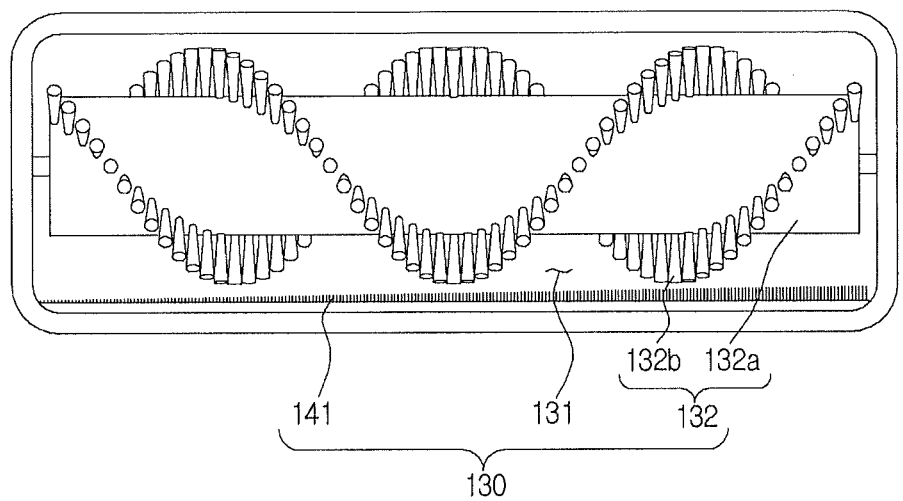

FIGS. 1 through 3 illustrate a robot cleaner 100 according to one or more embodiments. In detail, FIG. 1 is a top perspective view of a robot cleaner 100, and FIGS. 2 and 3 are bottom perspective views of a robot cleaner 100, wherein FIG. 2 shows an example and FIG. 3 shows another example.

When a cleaning command is received from a user or when the system clock reaches a scheduled time, the robot cleaner 100 may travel about an area to be cleaned to suck up foreign substances such as dust present on a floor or to wipe the dust off the floor, thereby cleaning the floor. If cleaning is completed or if a battery voltage gets below a reference voltage, the robot cleaner 100 may dock with a recharging base 200, and if docking is completed, the robot cleaner 100 may receive power from the recharging base 200 and may be charged.

The recharging base 200 may include a transformer connected to an external commercial alternating current power supply to receive commercial alternating current power and to convert the received commercial alternating current power, a rectifier for half-wave or full-wave rectifying the converted power, a smoothing unit for smoothing the rectified power, and a voltage regulator for outputting the smoothed power as direct current power having a predetermined voltage. The direct current power output from the voltage regulator may be supplied to the robot cleaner 100 through a power terminal.

The robot cleaner 100 may travel along a predetermined pattern based on map information stored therein to clean an area to be cleaned. The robot cleaner 100 may determine a distance to an obstacle, e.g., furniture, office supplies, walls, etc., in the cleaning area, using a distance sensor, and may drive a wheel selectively according to the determined distance to change a traveling direction, thereby possibly cleaning the cleaning area.

As illustrated in FIG. 1, the robot cleaner 100 may include a main body 111 forming an external appearance, an input unit 112 mounted on the main body 111 to receive operation information, schedule information, etc., a display unit 113 mounted on the main body 111 to display operation information, an imaging unit 114 mounted on the main body 111 to acquire an image of an area to be cleaned during cleaning, and a bumper 115 disposed in the front part of the main body 111 to cushion the impact when the robot cleaner 100 collides with an obstacle.

Additionally, another bumper 115 may be disposed in the back part of the main body 111.

The robot cleaner 100 may further include obstacle detectors 116 installed around the bumper 115 to detect obstacles, and a first docking detector (not shown) for measuring a distance to the recharging base 200 upon docking with the recharging base 20. Accordingly, the recharging base 200 may include a second docking detector (not shown) for communicating with the first docking detector, and the first and second docking detectors may be positioned at a similar height.

Each of the obstacle detectors 116 may be, for example, at least one sensor among a contact sensor, a proximity sensor, an ultrasonic sensor, an image sensor, a laser scanner, and an infrared sensor, and each of the first and second docking detectors may be at least one sensor among an infrared sensor and an ultrasonic sensor, etc.

As illustrated in FIG. 2, the robot cleaner 100 may include a traveling unit 120 that may be installed in the lower part of the main body 111 to move the robot cleaner 100, and a brush unit 130 that may be installed in the lower part of the main body 111 to sweep or scatter dust off a floor.

The traveling unit 120 may include a pair of wheels 121 and 122 that may be provided in the facing side edges of the main body 111 to move the robot cleaner 100 forward and backward or rotate the robot cleaner 100, first and second motors 123 and 124 for supplying a driving force to the respective wheels 121 and 122, and a caster wheel 125 that may be installed in the front part of the main body 111 to rotate the robot cleaner 100 according to the surface state of a floor on which the robot cleaner 100 is traveling so that the robot cleaner 100 may travel in a different direction.

The caster wheel 125 may also act to support the robot cleaner 100, thereby possibly settling the robot cleaner 100 and preventing the robot cleaner 100 from falling down. The caster wheel 125 may be fabricated in the shape of a roller or a caster, for example.

Also, the traveling units 120 may include first and second Revolution Per Minute (RPM) detectors (126 and 127 of FIG. 4) for measuring RPMs of the first and second motors 123 and 124 in order to possibly determine a traveling trajectory.

Each of the first and second RPM detectors 126 and 127 may include an encoder, etc.

The brush unit 130 may include a main brush 132 that may be provided in an inlet aperture 131 formed in the lower part of the main body 111, and a pair of side brushes 133 that may be provided in the lower part of the front portion of the main body 111 and may be positioned with the caster wheel 125 in between.

The main brush 132 may function to sweep dust out a floor, thereby possibly improving the efficiency of sucking dust. The main brush 132 may include a roller 132a and a blush element 132b, and may rotate by a third motor 134.

The side brushes 133 may sweep dust existing below the front part of the robot cleaner 100 and dust of areas which the main brush 132 cannot cover toward the inlet aperture 131, thereby possibly enhancing the efficiency of cleaning.

The robot cleaner 100 may further include a dust container 140 installed near the main brush 132 to collect foreign substances such as dust gathered through the main brush 132. The robot cleaner 100 may collect foreign substances such as dust using a suction force.

Also, the robot cleaner 100 may further include a blade 141 for guiding dust swept by the main brush 132 to the dust container 140.

In more detail, the blade 141 may extend from the entrance of the dust container 140 to the outside in such a manner as to contact the brush element 132b of the main blush 132 in the rear part of the main brush 132, thus possibly guiding dust swept by the brush element 132 of the rotating main brush 132 to the dust container 140.

Since the blade 141 may be positioned to tightly contact the floor, dust swept by the main brush 132 may be prevented from scattering out.

As illustrated in FIG. 3, the blade 141 may be positioned at a predetermined angle with respect to the rotating shaft of the roller 132a of the main brush 132.

The blade 141 may have a longer distance to the main brush 132 gradually from one end to the other end so as to possibly collect dust scattering out during traveling through the wider space with the main brush 132.

Through the structure as described above, the robot cleaner 100 may enhance the efficiency of collecting dust.

In addition, the robot cleaner 100 may further include a rag (not shown) for wet cleaning in the inlet aperture 131. The rag may be disposed around the main brush 132 together with the main brush 132, or may be independently disposed instead of the main brush 132.

The robot cleaner 100 may include a battery unit 150 for supplying driving power to driving units including the first, second, and third motors 123,124 and 134, and recharging terminals 151 and 152 electrically connected to the battery unit 150 and to be electrically connected to the recharging base 200 upon docking with the recharging base 200.

The battery unit 150 may be a secondary rechargeable battery. The battery unit 150 may be electrically connected to the recharging base 200 through the two recharging terminals 151 and 152 to receive power from the recharging base 200, thereby possibly being charged.

Figure 4:
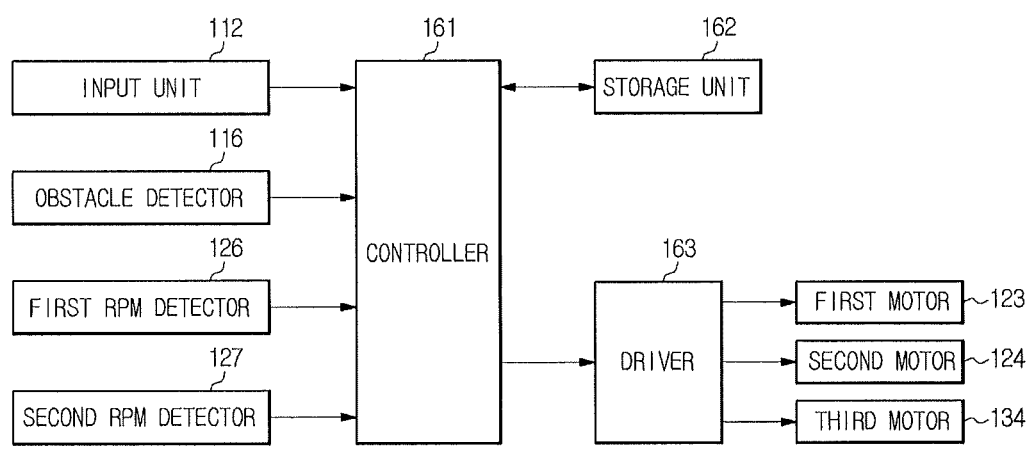
FIG. 4 is a block diagram illustrating the robot cleaner according to one or more embodiments.

FIG. 4 is a block diagram illustrating the robot cleaner 100 according to one or more embodiments. Referring to FIG. 4, the robot cleaner 100 may include an input unit 112, an obstacle detector 116, a first RPM detector 126, a second RPM detector 127, a controller 161, a storage unit 162, and a driver 163.

The input unit 112 may include, for example, a cleaning start/end button, a cleaning scheduling button, a cleaning mode selecting button, etc.

The input unit 112 may receive, for example, a cleaning start command, a cleaning scheduling command, etc. from a user, or receives a cleaning mode, e.g., a normal cleaning mode, a simple cleaning mode, a deep cleaning mode, etc., which are classified according to the intensity of cleaning, from the user.

The obstacle detector 116 may detect peripheral obstacles when the robot cleaner 100 is traveling.

For example, if the obstacle detector 116 is an ultrasonic sensor, the ultrasonic sensor 116 may generate ultrasonic waves according to a command from the controller 161, may receive ultrasonic waves reflected by an obstacle, and may transfer a detection signal corresponding to the received ultrasonic waves to the controller 161.

Also, if the obstacle detector 116 is an image sensor, the image sensor 116 may acquire images about surroundings while the robot cleaner 100 is traveling, may process the acquired images, and may transfer the processed images to the controller 161.

As such, in the case of acquiring images to detect obstacles, it may be possible to detect obstacles based on images acquired by the imaging unit 114 (see FIG. 1) instead of a separate image sensor.

The first RPM detector 126 may detect a RPM of the first motor 123 and may transmit the result of the detection to the controller 161, and the second RPM detector 127 may detect a RPM of the second motor 124 and may transmit the result of the detection to the controller 161.

The RPM of the first motor 123, detected by the first RPM detector 126 and the RPM of the second motor 124, detected by the second RPM detector 127 may be used as information for determining a traveling trajectory of the robot cleaner 100.

The traveling trajectory may be created based on the traveling distance, rotation angle, etc. of the robot cleaner 100.

If a cleaning command is received from a user or if the system clock reaches a scheduled time, the controller 161 may control driving of the first and second motors 123 and 124 such that the robot cleaner 100 may travel about an area to be cleaned, and may control driving of the third motor 134 to rotate the main brush 132.

Figure 8:
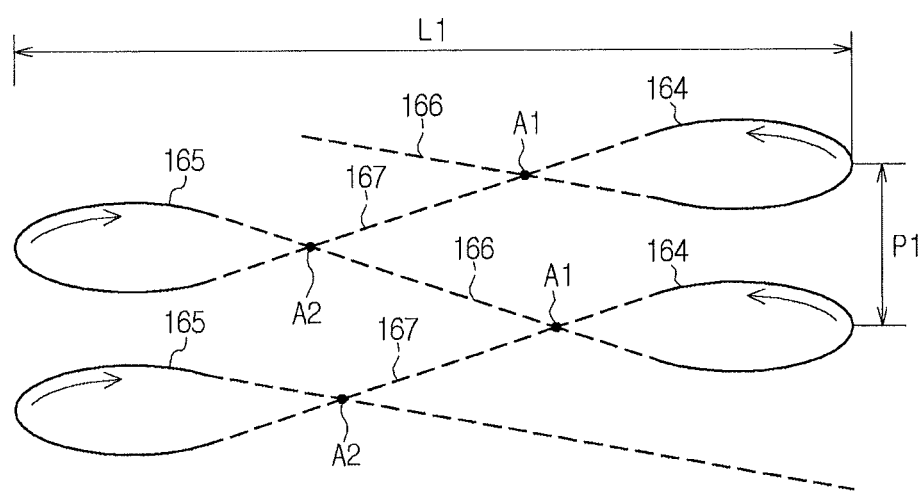
FIG. 8 illustrates an exemplary traveling pattern of the robot cleaner according to one or more embodiments.

The controller 161 may divide the cleaning area into a plurality of cells in correspondence to a cleaning mode selected by a user through the input unit 112, and may enable the robot cleaner 100 to sequentially travel through the plurality of cells while controlling RPMs of the first and second motors 123 and 124 such that the robot cleaner 100 travels along a "Figure 8"-shaped traveling pattern.

That is, the controller 161 may adjust the RPMs of the first and second motors 123 and 124 according to changes in curvature of the "Figure 8"-shaped traveling pattern.

At this time, the robot cleaner 100 may continuously travel without stopping in one cell through traveling along the "Figure 8"-shaped traveling pattern.

If the controller 161 may detect an obstacle while continuously traveling along the "Figure 8"-shaped traveling pattern, the controller 161 may control the RPMs of the first and second motors 123 and 124 based on a distance to the obstacle to regenerate a "Figure 8"-shaped traveling pattern in advance before collision with the obstacle.

Figure 5:
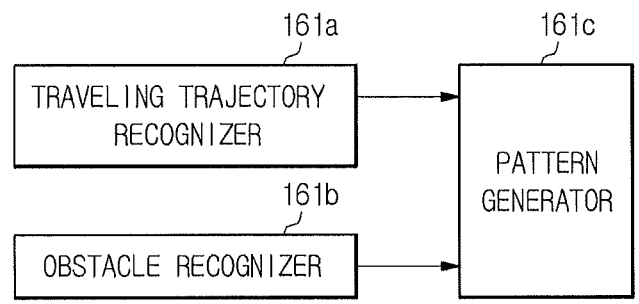
FIG. 5 is a block diagram illustrating a controller included in the robot cleaner according to one or more embodiments.

Referring to FIG. 5, the controller 161 may include a traveling trajectory detector 161a, an obstacle detector 161b, and a pattern generator 161c. The components of the controller 161 will be described in detail with reference to FIG. 5, below.

FIG. 5 is a block diagram illustrating the controller 161 included in the robot cleaner 100 according to one or more embodiments.

The traveling trajectory detector 161a nay detect a traveling distance based on RPMs of the first and second motors 123 and 124, that may be respectively detected by the first and second RPM detectors 126 and 127, may detect a rotation angle based on a difference between the RPMs of the first and second motors 123 and 124, and may determine a traveling trajectory of the robot cleaner 100 based on the traveling distance and the rotation angle.

Also, the traveling trajectory detector 161a may include, for example, at least one sensor among a gyro sensor, an accelerometer, and an image sensor, etc., and may detect a traveling trajectory of the robot cleaner 100 using the at least one sensor.

The obstacle detector 161b may detect a distance to an obstacle based on a detection signal transmitted from the obstacle detector 116.

For example, if the obstacle detector 116 is an ultrasonic sensor, the ultrasonic sensor 116 may calculate a distance to a detected obstacle based on transmission and reception times of ultrasonic waves, and if the obstacle detector 116 is an image sensor, the image sensor 116 may calculate a distance to a detected obstacle based on processed images about surroundings.

The pattern generator 161c may generate a "Figure 8"-shaped traveling pattern based on the detected traveling trajectory of the robot cleaner 100 and pre-stored information about the "Figure 8"-shaped traveling pattern, and if an obstacle is detected, the pattern generator 161 may regenerate a "Figure 8"-shaped traveling pattern based on a distance to the detected obstacle.

The "Figure 8"-shaped traveling pattern may include a first straight path, a first rotation path for rotation in a first direction, a second rotation path for rotation in a second direction opposite to the first direction, and a second straight path connecting the first rotation path to the second rotation path.

The first straight path, the first rotation path, the second straight path, and the second rotation path may be sequentially connected to each other, thereby forming the "Figure 8"-shaped traveling pattern.

In detail, the first straight path may connect to the first rotation path, and the first rotation path may connect to the second straight path intersecting the first straight path. Also, the second straight path may connect to the second rotation path, and the second rotation path may connect to a next first straight path intersecting the second straight path.

In other words, the robot cleaner 100 may fill a cell with a plurality of "Figure 8"-shaped traveling patterns spaced at regular intervals, wherein neighboring "Figure 8"-shaped traveling patterns may be connected to each other by a first straight path.

The information about the "Figure 8"-shaped traveling pattern may include, for example, a pattern length, a pitch length, a first rotation angle, a second rotation angle, a first path length, a second path length, etc.

The pattern length may be a length formed by the first rotation path, the second straight path, and the second rotation path, and the pitch length is a length between pitch points of neighboring "Figure 8"-shaped traveling patterns.

The first rotation angle may be an angle to which the robot cleaner 100 may rotate to travel along the first rotation path, the second rotation angle may be an angle to which the robot cleaner 100 may rotate to travel along the second rotation path, the first path length may be the length of the first straight path, and the second path length may be the length of the second straight path.

The storage unit 162 may store, for example, a pattern length, a pitch length, a first rotation angle, a second rotation angle, a first path length, a second path length, and a cell size in correspondence to each cleaning mode.

Here, the first and second rotation angles may include rotation angles of points forming a closed curve such as an ellipse or circle.

That is, the storage unit 162 may further store information about a first rotation angle of several points on a closed curve forming the first rotation path, and a distance between two neighboring points, and information about a second rotation angle of several points on a closed curve forming the second rotation path, and information about a distance between two neighboring points.

Also, the storage unit 162 may further store information about RPMs of the first and second motors 123 and 124 for rotating the robot cleaner 100 to the first rotation angle, and information about RPMs of the first and second motors 123 and 124 for rotating the robot cleaner 100 to the second rotation angle.

The driver 163 may drive the first and second motors 123 and 124 according to a command from the controller 161 to change a traveling speed of the robot cleaner 100, or may drive the first and second motors 123 and 124 at different RPMs according to a command from the controller 161 to change a traveling direction of the robot cleaner 100. Also, the driver 163 may drive the third motor 134 according to a command from the controller 161 to change a rotation speed of the main brush 132 (see FIG. 2) or stop rotating the main brush 132.

Accordingly, cleaning based on the "Figure 8"-shaped traveling pattern may prevent dust from scattering out of the main brush 132, and drive dust clung to a rag without scattering the dust if the robot cleaner 100 includes the rag instead of the main brush 132. Accordingly, since the robot cleaner 100 can continuously without stopping, it may be possible to improve the efficiency of cleaning and improve an initial coverage rate.

Figure 6:
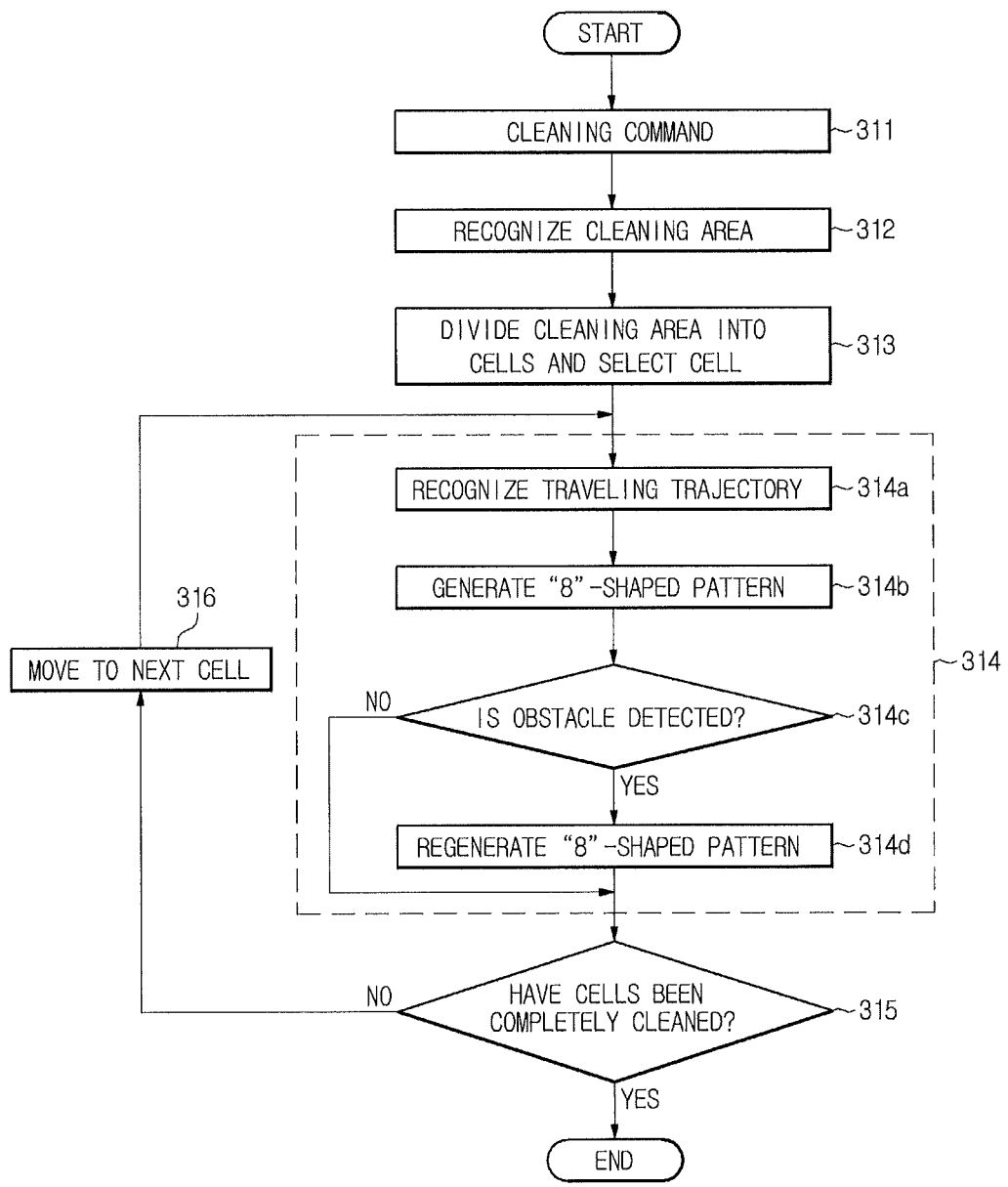
FIG. 6 is a flowchart illustrating a method for controlling the robot cleaner according to one or more embodiments.

FIG. 6 is a flowchart illustrating a method for controlling the robot cleaner 100 according to one or more embodiments. The following description will be given with reference with FIGS. 6, 7, and 9.

If a cleaning command is received from a user or if the system clock reaches a scheduled time (311), the robot cleaner 100 may acquire an image about surroundings using an imaging unit, and may determine an area to be cleaned based on the acquired image (312).

Alternatively, the robot cleaner 100 may determine a cleaning area at its current location by performing wall following.

Then, the robot cleaner 100 may divide the cleaning area into a plurality of cells, and may decide an order in which the plurality of cells will be cleaned.

Figure 7:
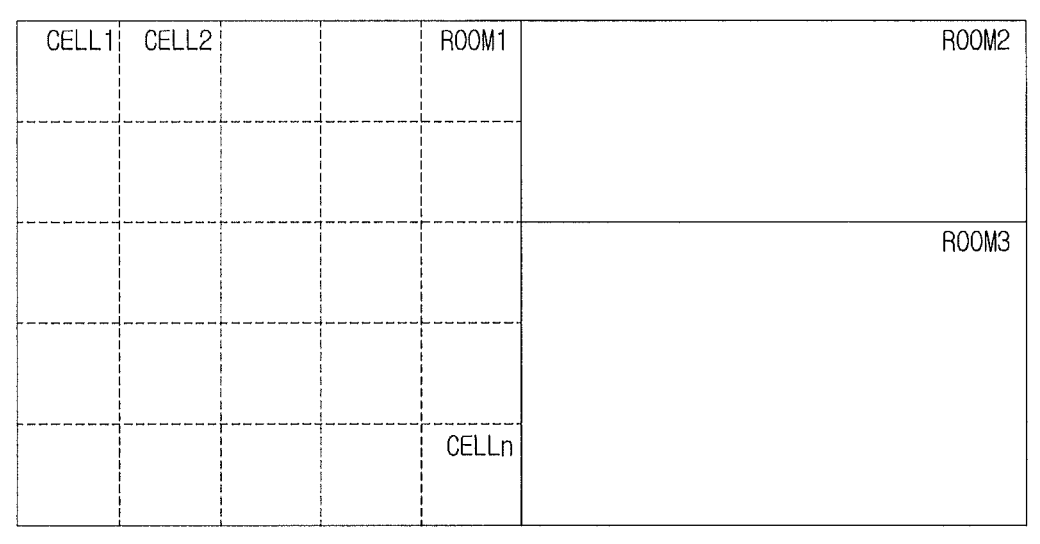

Referring to FIG. 7, if the robot cleaner 100 is presently located in a first room ROOM1 when there are three rooms in a cleaning area, the robot cleaner 100 may determine a shape, a size, etc. of the first room ROOM1.

Then, the robot cleaner 100 may divide the first room ROOM1 into a plurality of cells CELL1, CELL2, . . . , CELLn having a predetermined size based on the shape and size of the first room ROOM1, and may decide an order in which the plurality of cells CELL1, CELL2, . . . , CELLn will be cleaned by connecting neighboring cells to each other such that the robot cleaner 100 can continuously travel through the plurality of cells CELL1, CELL2, . . . , CELLn.

If a cleaning mode among, for example, a normal cleaning mode, a simple cleaning mode, and a deep cleaning mode, etc., is selected by the user, the robot cleaner 100 may check information about a traveling pattern corresponding to the selected cleaning mode.

The cleaning modes may be classified according to the intensity of cleaning, and traveling patterns corresponding to the respective cleaning modes are the same "Figure 8"-shaped patterns having different sizes. This will be described in detail with reference to FIG. 8, below.

FIG. 8 illustrates an exemplary traveling pattern of the robot cleaner 100 according to one or more embodiments;

A "Figure 8"-shaped pattern may include a first rotation path having an elliptical curve for rotation in a first direction, a second rotation path having an elliptical curve for rotation in a second direction opposite to the first direction, a first straight path 166 entering the first rotation path 164, and a second straight path 167 connecting the first rotation path 164 to the second rotation path 165.

The "Figure 8"-shaped pattern may form a traveling pattern successively connected from the first rotation path 164 to the second rotation path 165 via the second straight path 167 without stopping.

That is, the "Figure 8"-shaped pattern may form a traveling pattern for causing the robot cleaner 100 to move from the first straight path 166 to the first rotation path 164, and then from the first rotation path 164 to the second straight path 167 intersecting the first straight path 166.

Also, the traveling pattern may cause the robot cleaner 100 to move from the second straight path 167 to the second rotation path 165 having a rotation direction opposite to that of the first rotation path 164, and then from the second rotation path 165 to a next first straight path intersecting the second straight path 167.

The traveling pattern may include a first intersection A1 and a second intersection A2.

Also, information about the "Figure 8"-shaped traveling pattern may include a pattern length L1, a pitch length P1, a first rotation angle, a second rotation angle, a first path length of a first straight path, and a second path length of a second straight path for each cleaning mode.

Here, the pattern length L1 may be a length formed by the first rotation path 164, the second straight path 167, and the second rotation path 165, and the pitch length P1 may be a length between pitch points of neighboring "Figure 8"-shaped traveling patterns.

The first rotation angle may be a rotation angle of the robot cleaner 100 for forming the first rotation path 164, and the second rotation angle may be a rotation angle of the robot cleaner 100 for forming the second rotation path 165. The first and second rotation angles may have the same magnitude and opposite directions.

The first path length of the first straight path 166 may be a distance from a cleaning starting point to a start point of the first rotation path 164, or a distance from an end point of the second rotation path 165 to a start point of a first rotation path 164 of a next traveling pattern.

Here, the distance from the cleaning starting point to the start point of the first rotation path 164 may be the same as or different from the distance from the end point of the second rotation path 165 to the start point of the first rotation path 164 of the next traveling pattern.

The second path length of the second straight path 167 may be a distance from an end point of the first rotation path 164 to a start point of the second rotation path 165.

However, the pattern length L1, the pitch length P1, the first rotation angle, the second rotation angle, the first path length of the first straight path, and the second path length of the second straight path may be different according to the respective cleaning modes.

For example, if the robot cleaner 100 is in the normal cleaning mode, the pattern length L1, the pitch length P1, the first rotation angle, the second rotation angle, the first path length of the first straight path 166, and the second path length of the second straight path 167 may be set to predetermined reference values, and, if the robot cleaner 100 is in the simple cleaning mode, the pattern length L1, the pitch length P1, the first rotation angle, the second rotation angle, the first path length of the first straight path, and the second path length of the second straight path may be adjusted to greater values than in the normal cleaning mode such that greater closed curves are formed by the first and second rotation paths if the robot cleaner 100 needs to perform quick, simple cleaning.

Also, when the robot cleaner 100 is in the simple cleaning mode, it may be possible to adjust only the lengths of the first and second straight paths 166 and 167 to greater values. In this case, since the pattern length L1 lengthens, the robot cleaner 100 may clean a wider cell with the same number of patterns as in the normal cleaning mode.

In addition, it may be possible to adjust only the pitch length P1 to a greater value.

Meanwhile, if the robot cleaner 100 is in the deep cleaning mode, the pattern length L1, the pitch length P1, the first rotation angle, the second rotation angle, the first path length of the first straight path 166, and the second path length of the second straight path 167 may be adjusted to smaller values than in the normal cleaning mode such that smaller closed curves may be formed by the first and second rotation paths since the robot cleaner 100 may need to thoroughly clean each cell.

Also, it may be possible to adjust only the lengths of the first and second straight paths 166 and 167 to smaller values, or to adjust only the pitch length to a smaller value. Alternatively, it may also be possible to adjust the first and second rotation angles to smaller values such that smaller closed curves are formed by the first and second rotation paths.

Meanwhile, the robot cleaner 100 may adjust the sizes of a plurality of cells in a cleaning area in consideration of information about a traveling pattern set to a different size according to a cleaning mode.

This is aimed at possibly preventing the size of a final cell area at which traveling terminates from becoming a size incapable of completing a predetermined traveling pattern when the robot cleaner 100 repeatedly travels about the cell along the predetermined traveling pattern. That is, this is aimed at possibly preventing a final cell area from remaining uncleaned.

Then, the robot cleaner 100 may select a cell having highest priority from among the plurality of cells (313), and may perform cleaning while traveling along a predetermined traveling pattern, starting from the selected cell (314). This operation will be described in detail with reference to FIG. 9, below.

Figure 9:
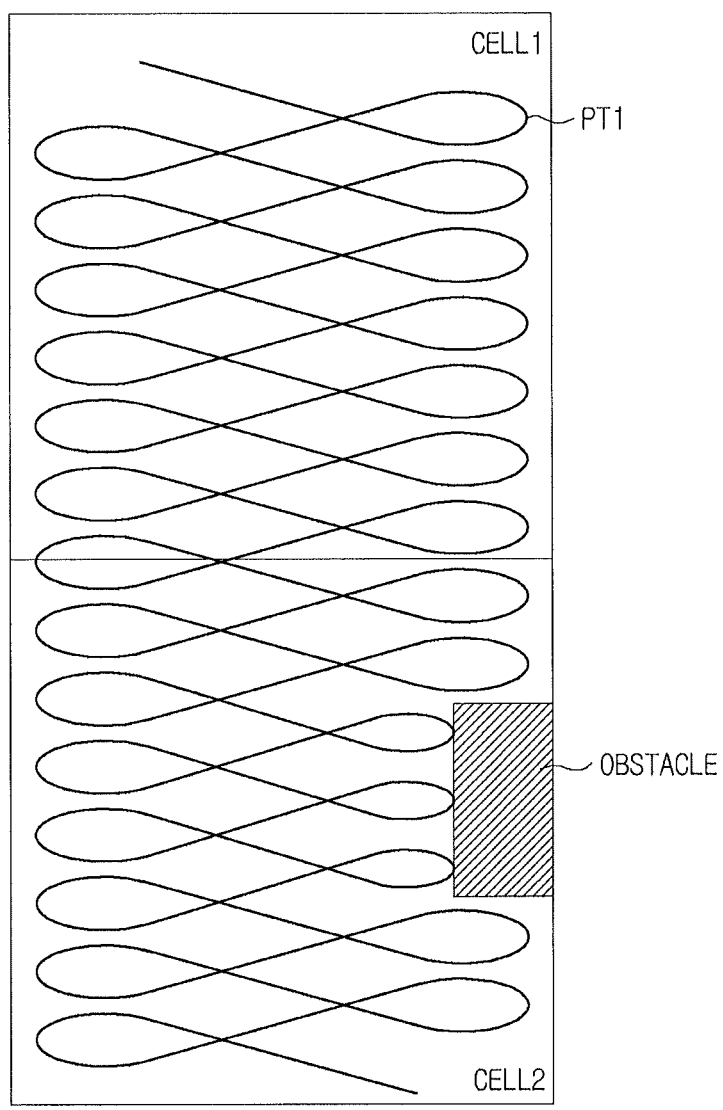
FIG. 9 illustrates exemplary traveling of the robot cleaner according to one or more embodiments.

As illustrated in FIG. 9, the robot cleaner 100 may travel about a cell to clean the cell while continuously forming a "Figure 8"-shaped traveling pattern PT1 at regular intervals according to a cleaning command.

At this time, the robot cleaner 100 may fill the cell with "Figure 8"-shaped patterns PT1 arranged at regular intervals, wherein neighboring "Figure 8"-shaped traveling patterns may be connected to each other by a first straight path (166 of FIG. 8).

That is, referring to FIGS. 8 and 9, the robot cleaner 100 may travel along the first straight path 166 in a first direction from a cleaning start point, may travel along the first rotation path 164 from an end point of the first straight path 166 while rotating to the first rotation angle, and then may travel on a straight line along the second straight path 177 by the second path length from an end point of the first rotation path 164 while maintaining the traveling direction. At this time, the second straight path may intersect the first straight path.

Then, the robot cleaner 100 may travel along the second rotation path 165 while rotating to the second rotation angle from a start point of the second rotation path 165, and then may travel on a straight line along a first straight path 166 of a next traveling pattern by the first path length from an end point of the second rotation path 165 while maintaining the traveling direction.

As such, the robot cleaner 100 may travel while continuously forming "Figure 8"-shaped patterns.

Also, during traveling, the robot cleanser 100 may detect RPMs of its both wheels using the first and second RPM detectors 126 and 127.

Then, the robot cleanser 100 may detect a traveling distance based on the RPMs of the first and second motors 123 and 124, detected by the first and second RPM detectors 126 and 127 (see FIG. 4), may detect a rotation angle based on a difference between the RPMs of the first and second motors 123 and 124, and may determine a traveling trajectory based on the traveling distance and the rotation angle (314a).

Successively, the robot cleaner 100 may generate a "Figure 8"-shaped traveling pattern for next traveling based on the determined traveling trajectory and information about the "Figure 8"-shaped traveling pattern (314b), and may change a traveling direction and a traveling speed based on the generated traveling pattern so that the robot cleaner 100 may travel along the generated traveling pattern For example, if a current traveling trajectory is a second rotation path, the robot cleaner 100 may generate a first straight path 166, a first rotation path 164, etc. so as to generate a next traveling pattern based on the information about the "Figure 8"-shaped traveling pattern.

Then, the robot cleaner 100 may detect a peripheral obstacle while continuously traveling along the generated "Figure 8"-shaped traveling pattern. If an obstacle is detected (314c), the robot cleaner 100 may determine a distance to the obstacle based on a detection signal transmitted from the obstacle detector 116, and may generate a "Figure 8"-shaped pattern based on the determined distance to the obstacle (314d). This operation will be described in detail with reference to FIG. 9, below.

FIG. 9 illustrates a difference between a "Figure 8"-shaped traveling pattern of a cell CELL1 including no obstacle and a "Figure 8"-shaped traveling pattern of another cell CELL2 including an obstacle.

As illustrated in FIG. 9, if an obstacle is detected, the robot cleaner 100 may regenerate a "Figure 8"-shaped traveling pattern based on a distance to the detected obstacle so that it may rotate to travel out of the obstacle before collision with the obstacle. At this time, the robot cleaner 100 may regenerate a rotation path so that it can change the traveling direction to the opposite direction at a point at which the obstacle has been detected and then continuously travel without stopping.

The robot cleaner 100 may repeatedly perform an operation of generating a traveling trajectory and detecting an obstacle until a selected cell is completely cleaned, and may travel while generating and regenerating "Figure 8"-shaped patterns based on the traveling trajectory and the results of the obstacle detection, thereby possibly cleaning the selected cell.

Then, the robot cleaner 100 may determine whether the plurality of cells have been completely cleaned (315), and if it is determined that the plurality of cells have not yet been completely cleaned, the robot cleaner 100 may move to the next cell (316), and may clean the next cell through operations 311 through 314 described above.

Meanwhile, if it is determined that the plurality of cells have been completely cleaned, the robot cleaner 100 may terminate cleaning and dock with a recharging base (200 of FIG. 1).

In this way, the robot cleaner 100 may continuously travel along "Figure 8"-shaped traveling patterns, thereby possibly driving dust collected during cleaning without scattering it. Particularly, in the case of wet cleaning using a rag, the robot cleaner 100 may drive dust clung to the rag possibly without scattering the dust.

Figure 10:
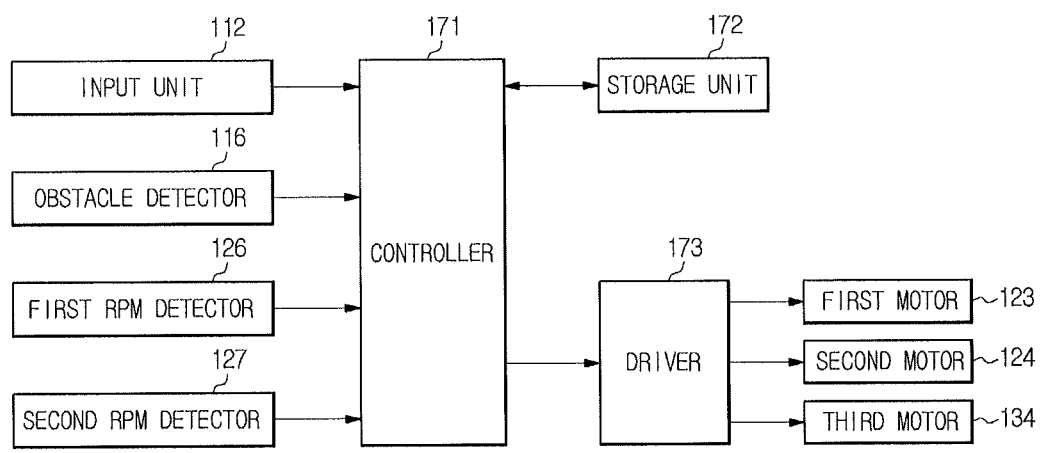
FIG. 10 is a block diagram illustrating a robot cleaner according to one or more embodiments.

FIG. 10 is a block diagram illustrating a robot cleaner according to one or more embodiments. Referring to FIG. 10, the robot cleaner may include an input unit 112, an obstacle detector 116, a first RPM detector 126, a second RPM detector 127, a controller 171, a storage unit 172, and a driver 173.

Since the input unit 112, the obstacle detector 116, the first RPM detector 126, and the second RPM detector 127 are the same as the corresponding components of the robot cleaner 100 according to the first embodiment described above with reference to FIG. 4, detailed descriptions thereof will be omitted.

The controller 171 may divide an area to be cleaned into a plurality of cells according to a cleaning mode selected by a user through the input unit 112, and may control RPMs of the first and second motors 123 and 124 such that the robot cleaner may sequentially travel through the plurality of cells along a "V"-shaped traveling pattern.

That is, the controller 171 may change a difference between RPMs of the first and second motors 123 and 124 according to the traveling direction of the "V"-shaped traveling pattern.

The robot cleaner may travel about a cell along the "V"-shaped traveling pattern, thereby possibly traveling continuously by only one rotation at a direction-change point.

The controller 171 may detect a traveling distance based on RPMs of the first and second motors 123 and 124, respectively detected by the first and second RPM detectors 126 and 127, may detect a rotation angle based on a difference between the RPMs of the first and second motors 123 and 124, and may determine a traveling trajectory of the robot cleaner based on the traveling distance and the rotation angle.

The controller 171 may generate a "V"-shaped traveling pattern based on the determined traveling trajectory of the robot cleaner and pre-stored information about the "V"-shaped traveling pattern.

If an obstacle is detected while the robot cleaner travels along the "V"-shaped traveling pattern, the controller 171 may control RPMs of the first and second motors 123 and 124 based to a distance to the obstacle to change the traveling direction before collision with the obstacle. That is, the controller 171 may regenerate a "V"-shaped traveling pattern before collision with an obstacle.

Here, the "V"-shaped traveling pattern may include a first straight path for traveling in a first direction and a second straight path for traveling in a second direction making a first angle with respect to the first direction.

That is, the robot cleaner may fill a cell with a plurality of "V"-shaped traveling patterns, wherein neighboring "V"-shaped traveling patterns make a first angle to each other.

For example, if a traveling pattern includes a first traveling pattern and a second traveling pattern, the first and second straight paths of the first traveling pattern may make the first angle to each other, the first and second straight paths of the second traveling pattern may also make the first angle to each other, and the second straight path of the first traveling pattern and the first straight path of the second traveling pattern may also make the first angle to each other.

Information about the "V"-shaped traveling pattern may include a pattern length, a pitch length, a first traveling distance, a second traveling distance, a first angle, etc.

The pattern length may be the vertical length of first and second straight paths, and the pitch length may be a length between pitch points of neighboring "V"-shaped traveling patterns.

The first traveling distance may be the length of the first straight path, the second traveling distance may be the length of the second straight path, and the first angle may be an angle made between the first and second straight paths.

The robot cleaner may further include an amount-of-dust detector (not shown) for detecting the amount of dust in an area to be cleaned, and the amount-of-dust detector may be an infrared sensor.

The controller 171 of the robot cleaner may automatically select a cleaning mode based on a detected amount of dust, and may control driving of a traveling unit according to the selected cleaning mode.

The storage unit 172 may store a pattern length, a pitch length, a first traveling distance, a second traveling distance, a first angle, and a cell size in correspondence to each cleaning mode.

Also, the storage unit 172 may store information about RPMs of the first and second motors 123 and 124 for rotating the robot cleaner by the first angle to change the traveling direction of the robot cleaner when a traveling path has to change. In addition, the storage 172 may further store traveling speeds for the first and second straight paths.

The driver 173 may drive the first and second motors 123 and 124 according to a command from the controller 171 to change a traveling speed of the robot cleaner, or may drive the first and second motors 123 and 124 at different RPMs according to a command from the controller 171 to change a traveling direction of the robot cleaner. Also, the driver 173 may drive the third motor 134 according to a command from the controller 171 to change a rotation speed of the main brush 132 (see FIG. 2) or stop rotating the main brush 132.

Accordingly, cleaning based on the "V"-shaped traveling pattern may prevent dust from scattering out of the main brush 132 by reducing the number of rotations of the robot cleaner when the traveling direction of the robot cleaner changes, and may reduce a time consumed for cleaning, thereby possibly improving an initial coverage rate.

Figure 11:
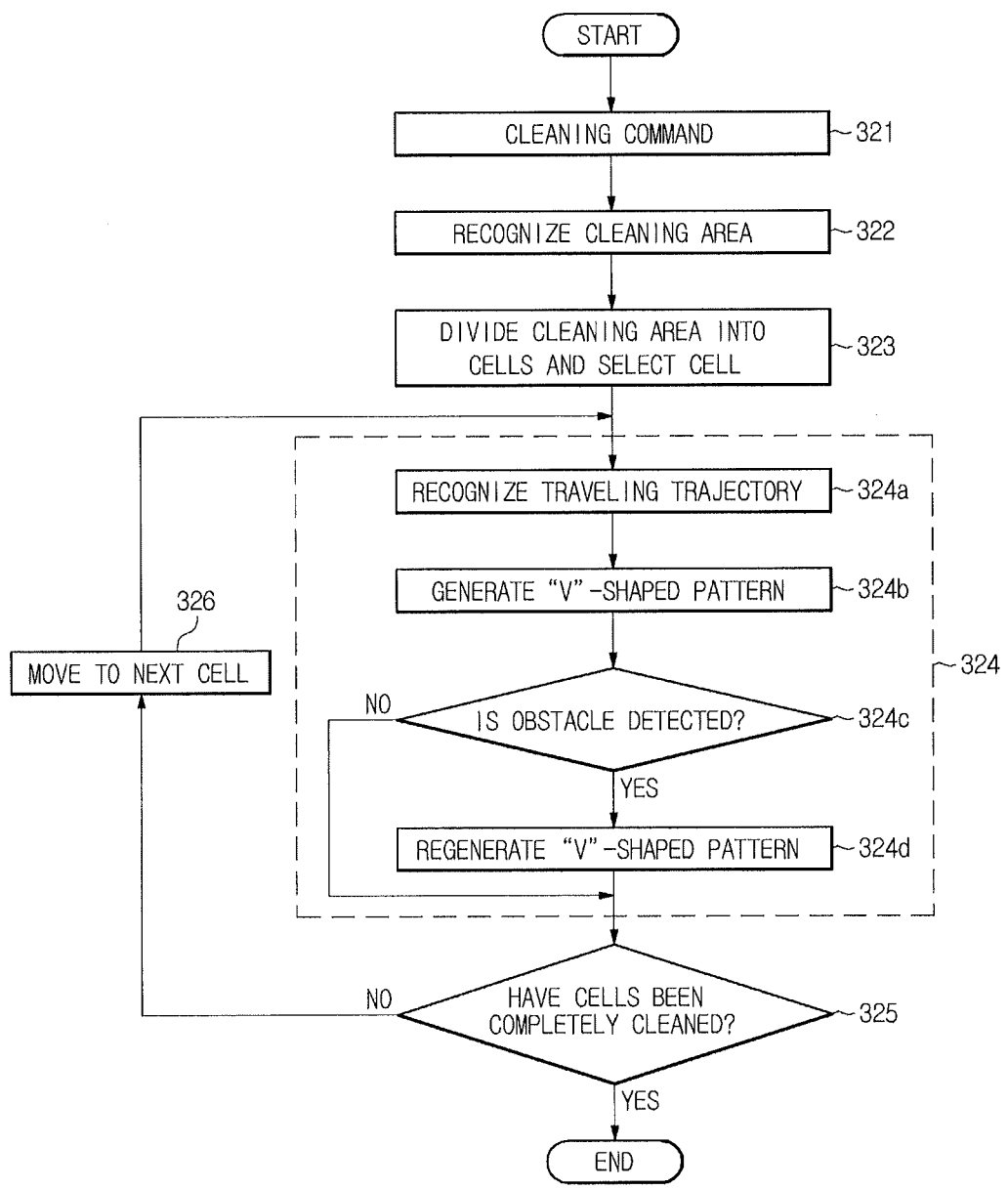
FIG. 11 is a flowchart illustrating a method for controlling the robot cleaner according to one or more embodiments.

FIG. 11 is a flowchart illustrating a method for controlling the robot cleaner according to one or more embodiments. The method for controlling the robot cleaner will be described with reference to FIG. 12.

When a cleaning command is received from a user or when the system clock reaches a scheduled time (321), the robot cleaner may acquire an image about surroundings using an imaging unit (114 of FIG. 1), and may determine an area to be cleaned based on the acquired image (322).

Then, the robot cleaner may divide the area to be cleaned into a plurality of cells, may decide an order in which the plurality of cells will be cleaned, and may select a cell to be cleaned (323).

Then, if a cleaning mode among, for example, a normal cleaning mode, a simple cleaning mode, and a deep cleaning mode is selected, the robot cleaner may check information about a traveling pattern corresponding to the selected cleaning mode.

The cleaning modes may be classified according to the intensity of cleaning, and traveling patterns corresponding to the respective cleaning modes may be the same "V"-shaped patterns having different sizes.

Figure 12:
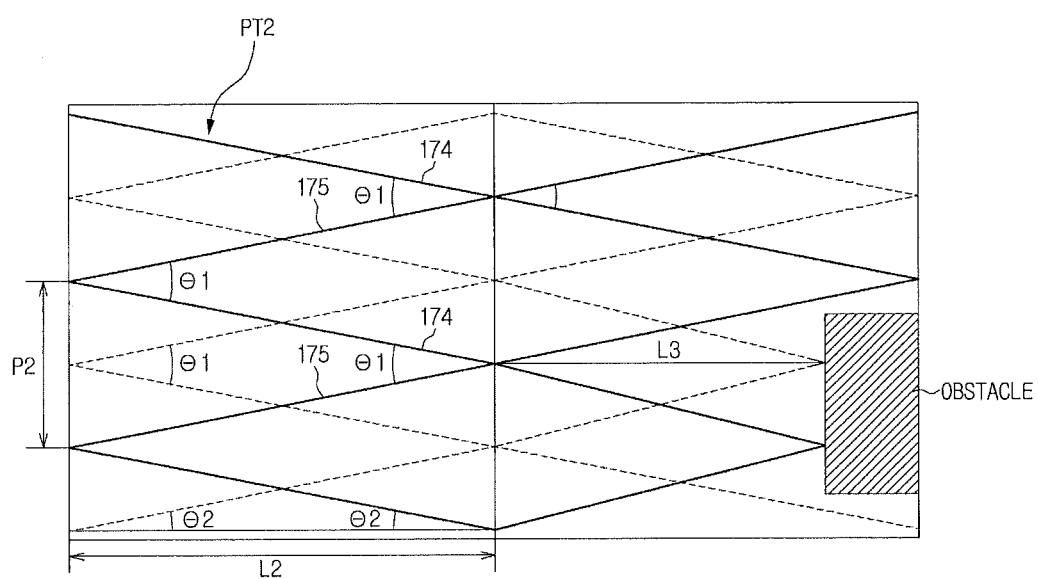
FIG. 12 illustrates an exemplary traveling pattern of the robot cleaner according to one or more embodiments.

FIG. 12 illustrates an exemplary traveling pattern of the robot cleaner according to one or more embodiments, and shows a difference between a "V"-shaped traveling pattern PT2 of a cell CELL1 including no obstacle and a "V"-shaped traveling pattern PT2 of another cell CELL2 including an obstacle.

The "V"-shaped pattern PT2 may include a first straight path 174 for traveling in a first direction which is a diagonal direction, and a second straight path 175 for traveling in a second direction which is a diagonal direction making a first angle $\theta 1$ with respect to the first direction, and a cell may be filled with a plurality of "V"-shaped traveling patterns PT2 successively arranged with the first angle $\theta 1$ with respect to each other.

Information about the "V"-shaped traveling pattern may include a pattern length L2, a pitch length P2, a first traveling distance, a second traveling distance, a predetermined angle, etc. for each cleaning mode. Here, the pattern length may be the vertical length of the first and second straight paths 174 and 175, and the pitch length P2 may be a length between pitch points of neighboring "V"-shaped patterns.

However, the pattern length L2, the pitch length P2, the first traveling distance, the second traveling distance, and the predetermined angle may be different according to the respective cleaning modes.

For example, if the robot cleaner is in the normal cleaning mode, the pattern length L2, the pitch length P2, the first traveling distance, the second traveling distance, and the first angle $\theta 1$ may be set to predetermined reference values, and, if the robot cleaner is in the simple cleaning mode, at least one of the pattern length L2, the pitch length P2, the first traveling distance, the second traveling distance, and the first angle $\theta 1$ may be adjusted to a greater value than in the normal cleaning mode since the robot cleaner may need to perform quick, simple cleaning.

For example, it is possible to adjust the pattern length L2 and the pitch length P2 to greater values or to adjust the pattern length L2 and the first angle $\theta 1$ to greater values. Accordingly, by applying a smaller number of traveling patterns to the same cell than in the normal cleaning mode, it may be possible to perform quick, simple cleaning.

Meanwhile, if the robot cleaner is in the deep cleaning mode, at least one of the pattern length L2, the pitch length P2, and the first angle $\theta 1$ may be adjusted to a smaller value than in the normal cleaning mode since the robot cleaner may need to thoroughly clean each cell.

For example, it is possible to adjust the pattern length L2 and the pitch length P2 to smaller values, or to adjust the pattern length L2 and the first angle $\theta 1$ to smaller values. Accordingly, by applying a greater number of traveling patterns to the same cell than in the normal cleaning mode, it is possible to thoroughly clean an area to be cleaned.

Meanwhile, since cleaning is performed twice at a point at which the first straight path meets the second straight path when the robot cleaner is in the normal cleaning mode, it is possible to set the pattern length L2, the pitch length P2, and the first angle θ1 based on the length of the main brush 132 (see FIG. 2).

Also, when the "V"-shaped traveling pattern is adjusted according to a cleaning mode, the pattern length L2, the pitch length P2, and the first angle θ1 can be adjusted using Equation (1) below:

$$L2=P2/(2\times\tan(\theta 1)). \quad (1)$$

Then, the robot cleaner may perform cleaning while traveling along a predetermined traveling pattern, starting from the selected cell (324). The operation of traveling and cleaning will be described in more detail below.

The robot cleaner may travel and may perform cleaning while continuously forming the "V"-shaped traveling pattern PT2 according to a cleaning command.

During traveling, the robot cleaner may detect RPMs of both wheels using the first and second RPM detectors 126 and 127 (see FIG. 10).

Then, the robot cleaner may detect a traveling distance based on RPMs of the first and second motors 123 and 124, respectively detected by the first and second RPM detectors 126 and 127 (see FIG. 10), may detect a rotation angle based on a difference between the RPMs of the first and second motors 123 and 124, and may determine a traveling trajectory of the robot cleaner based on the traveling distance and the rotation angle (324a).

Successively, the robot cleaner may generate a "V"-shaped traveling pattern for next traveling based on the determined traveling trajectory and information about the "V"-shaped traveling pattern (324b), and may change a traveling direction and a traveling speed based on the generated traveling pattern so that the robot cleaner can travel along the generated traveling pattern For example, if the robot cleaner determines that its current traveling trajectory is at the center point of a first straight path 174, the robot cleaner may generate the remaining distance of the first straight path 174, a first angle θ1, and a second straight path for next traveling based on the information about the "V"-shaped traveling pattern, thereby generating a "V"-shaped traveling pattern for next traveling.

Meanwhile, if the robot cleaner determines that its current traveling trajectory is on a second straight path 175, the robot cleaner may generate a first angle θ1 and a first straight path for next traveling based on the information about the "V"-shaped traveling pattern, thereby generating a next traveling pattern.

Then, the robot cleaner may detect a peripheral obstacle while continuously traveling along the generated "V"-shaped traveling pattern. If an obstacle is detected (324c), the robot cleaner may detect a distance to the obstacle based on a detection signal transmitted from an obstacle detector (116 of FIG. 10), and may regenerate a "V"-shaped traveling pattern based on the detected distance to the obstacle (324d).

As illustrated in FIG. 12, if the robot cleaner detects an obstacle, the robot cleaner may regenerate a "V"-shaped traveling pattern so that the robot cleaner can rotate to travel away from the obstacle before collision with the obstacle. At this time, the robot cleaner may regenerate the "V"-shaped traveling pattern such that it travels in the opposite direction of the traveling direction.

The robot cleaner may repeatedly perform an operation of generating a traveling trajectory and detecting an obstacle until the selected cell is completely cleaned, may travel while generating and regenerating "V"-shaped patterns based on the traveling trajectory, the results of the obstacle detection, and the information about the "V"-shaped traveling pattern, and may repeatedly travel about the same cell based on the "V"-shaped traveling pattern if the selected cell is completely cleaned.

As illustrated in FIG. 12, the robot cleaner may perform first traveling (denoted by solid lines) by continuously traveling about a cell along the "V"-shaped traveling pattern, then may rotate by a second angle θ2 at a point at which the first traveling has been completed, and then may perform second traveling in the opposite direction along the "V"-shaped traveling pattern, starting from the point at which the first traveling has been completed, thereby possibly cleaning areas not cleaned in the first traveling.

Then, the robot cleaner may determine whether the plurality of cells have been completely completed (325), may move to the next cell if it is determined that the plurality of cells have not yet been completely completed (326), and may clean the next cell through operations 321 through 324 described above.

Meanwhile, if it is determined that the plurality of cells have been completely completed, the robot cleaner may terminate cleaning, and may dock with a recharging base.

As such, by traveling along the "V"-shaped traveling pattern, it may be possible to reduce the number of rotations at direction-change points, thereby possibly reducing a cleaning time and accordingly possibly increasing an initial coverage rate.

Figure 13:
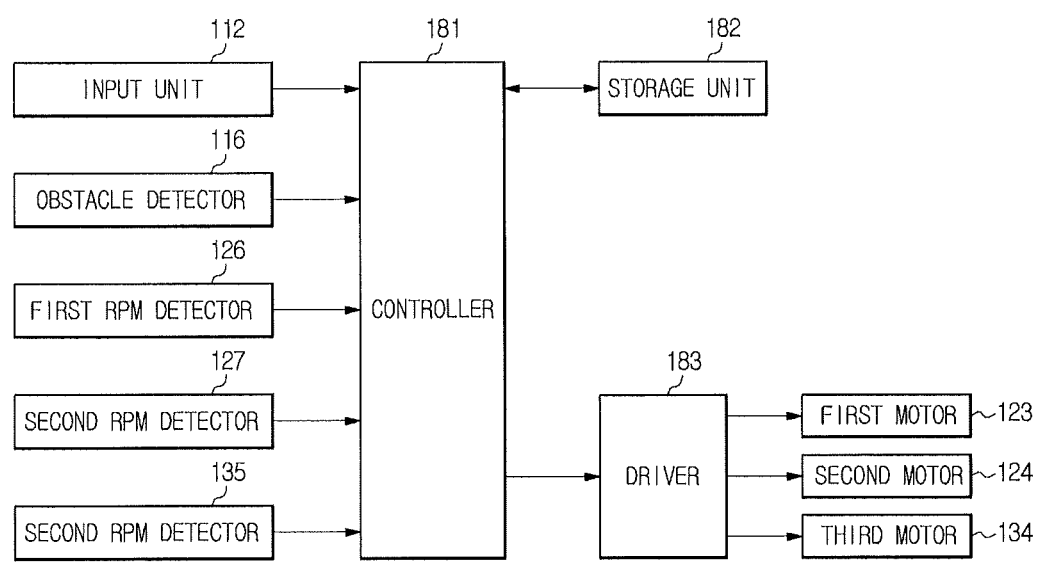
FIG. 13 is a block diagram illustrating a robot cleaner according to one or more embodiments.

FIG. 13 is a block diagram illustrating a robot cleaner according to one or more embodiments. Referring to FIG. 13, the robot cleaner may include an input unit 112, an obstacle detector 116, a first RPM detector 126, a second RPM detector 127, a controller 181, a storage unit 182, a driver 183, and a torque detector 135.

Since the input unit 112, the obstacle detector 116, the first RPM detector 126, and the second RPM detector 127 are the same as the corresponding components of the robot cleaner 100 according to the first embodiment described above with reference to FIG. 4, detailed descriptions thereof will be omitted.

The torque detector 135 may detect a torque applied to the third motor 134 for rotating the main brush 132 (see FIG. 2). The detected torque may be a torque caused by dust remaining between the main brush 132 and the blade 141.

The controller 181 may control driving of a traveling unit based on a predetermined traveling pattern. The predetermined traveling pattern may be the "Figure 8"-shaped traveling pattern or the "V"-shaped traveling pattern as described above.

Also, the controller 181 may control driving of the traveling unit for cleaning in, for example, a zig-zag pattern or a random pattern.

During traveling and cleaning, the controller 181 may compare the detected torque to a predetermined reference torque, and if the detected torque is greater than the predetermined reference, the controller 181 may control driving of the first and second motors 123 and 124 such that the robot cleaner travels in the opposite direction by a predetermined distance.

Figure 14:
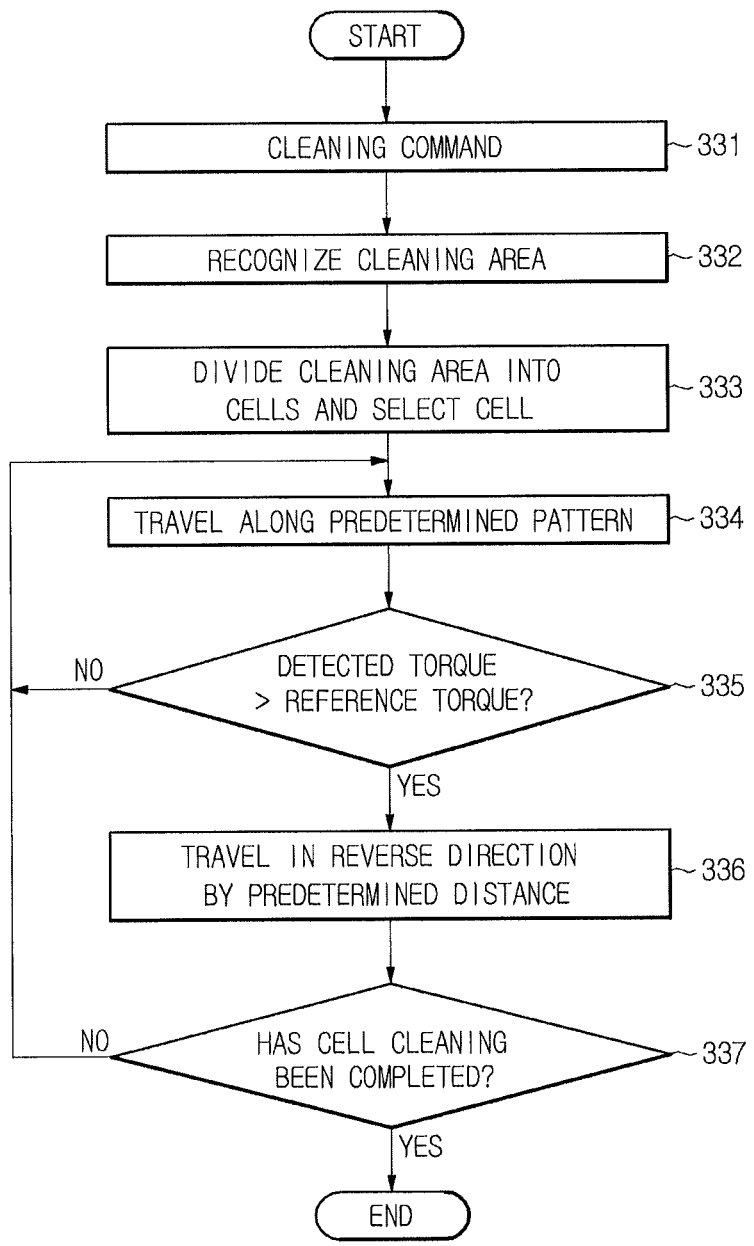
FIG. 14 is a flowchart illustrating a method for controlling the robot cleaner according to one or more embodiments.

FIG. 14 is a flowchart illustrating a method for controlling the robot cleaner according to one or more embodiments. The method for controlling the robot cleaner will be described in detail with reference to FIGS. 15 and 16, below.

If a cleaning command is received (331), the robot cleaner may determine an area to be cleaned (332).

Then, the robot cleaner may divide the cleaning area into a plurality of cells, and may decide an order in which the plurality of cells will be cleaned.

Then, the robot cleaner may select a cell that is first cleaned from among the plurality of cells (333), and may start to clean starting from the selected cell. At this time, the robot cleaner may clean the cell while traveling along the "Figure 8"-shaped traveling pattern or the "V"-shaped traveling pattern as described above (334).

During cleaning, the robot cleaner may detect a torque applied to the third motor 134 for rotating the main brush 132 (see FIG. 2), and may compare the detected torque to a predetermined reference torque (335).

If dust remains between the main brush 132 and the blade 141 (see FIG. 2), a torque of the third motor 134 for rotating the main brush 132 may exceed the predetermined reference torque since the dust disturbs rotation of the main brush 134.

Figure 15:
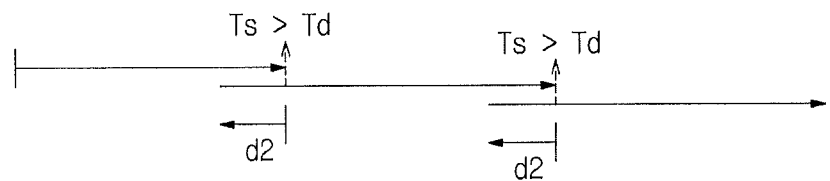
FIGS. 15 and 16 illustrate the method for controlling the robot cleaner according to one or more embodiments.

As illustrated in FIG. 15, if a detected torque Ts exceeds a predetermined reference torque Td, the robot cleaner may travel by a predetermined distance d2 in the opposite direction of the traveling direction (336).

Figure 16:
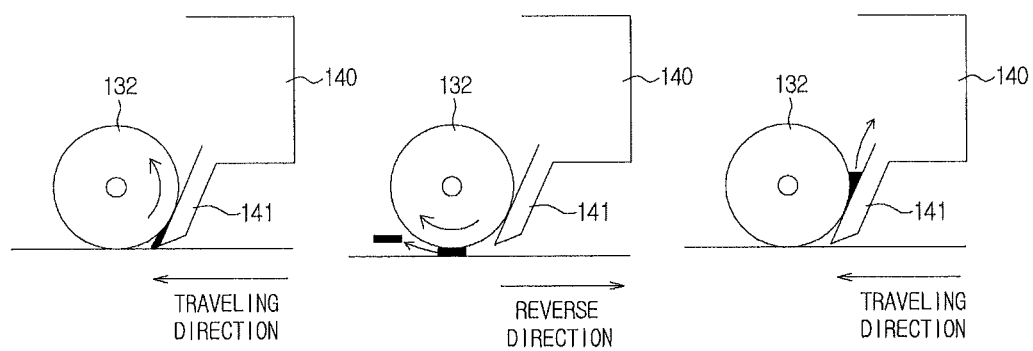

At this time, as illustrated in FIG. 16, the robot cleaner may reverse by changing the rotation directions of the first and second motors 123 and 124. At this time, the robot cleaner may also change the rotation direction of the third motor 134 so as to take out the dust remaining between the main brush 132 and the blade 141.

Also, it is possible to adjust the predetermined reference distance d2 based on the detected torque Ts.

Then, the robot cleaner may rotate the first and second motors 123 and 124 in the forward direction at a point at which the reverse-traveling has terminated, thus traveling in the traveling direction. At this time, the robot cleaner may again travel along a predetermined pattern to perform cleaning, and also, may suck up the dust taken out during the reverse-traveling.

Meanwhile, if the detected torque Ts is smaller than or equal to the predetermined reference torque Td, the robot cleaner may continuously travel along the predetermined pattern to perform cleaning.

Then, the robot cleaner may determine whether the selected cell has been completely cleaned based on information about a traveling trajectory and the size of the selected cell (337), and if it is determined that the selected cell has been completely cleaned, the robot cleaner may move to the next cell to perform cleaning.

Figure 17:
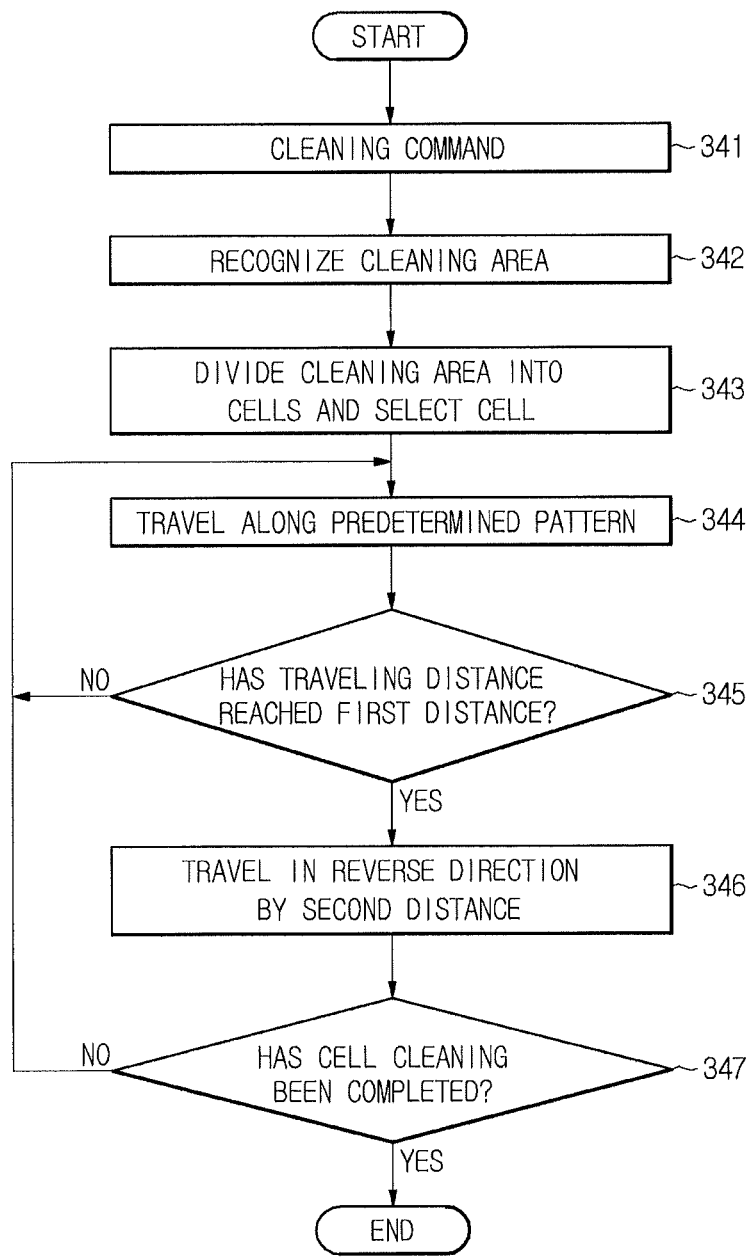
FIG. 17 is a flowchart illustrating another method for controlling the robot cleaner according to one or more embodiments.
Figure 18:
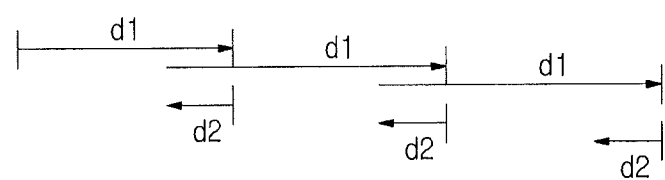
FIG. 18 illustrates the other method for controlling the robot cleaner according to one or more embodiments.

FIG. 17 is a flowchart illustrating another method for controlling the robot cleaner according to one or more embodiments. The method for controlling the robot cleaner will be described with reference to FIG. 18, below. In the current embodiment, the torque detector 135 of FIG. 13 can be omitted.

First, if a cleaning command is received (341), the robot cleaner may determine an area to be cleaned (342), may divide the determined area to be cleaned into a plurality of cells, and may decide an order in which the plurality of cells will be cleaned.

Then, the robot cleaner may select a cell that will be first cleaned from among the plurality of cells (343), and may start to clean starting from the selected cell. At this time, the robot cleaner may travel along the "Figure 8"-shaped traveling pattern or the "V"-shaped traveling pattern as described above to perform cleaning (344).

During cleaning, the robot cleaner may measure a traveling distance based on RPMs and rotation times of the first and second motors 123 and 124, and may compare the measured traveling distance to a first distance d1 (345).

If it is determined that the measured traveling distance has reached the first distance d1, the robot cleaner may reverse-rotate the first and second motors 123 and 124, and may reverse by a second distance d2 (346).

Thereby, dust remaining between the main brush 132 and the blade 141 may be removed.

One or more embodiments consider the fact that the amount of dust remaining between the blade 141 and the main brush 132 may be proportional to the traveling distance of the robot cleaner.

In addition, the robot cleaner may change the rotation direction of the third motor 134 for rotating the main brush 132 to the opposite direction, thereby possibly effectively removing the dust remaining between the main brush 132 and the blade 141.

Then, the robot cleaner may rotate the first and second motors 123 and 124 in the forward direction at a point at which the reverse-traveling has terminated, and thus may travel in the traveling direction. At this time, the robot cleaner again may travel along a predetermined traveling pattern to perform cleaning, and also may suck up the dust taken out during the reverse-traveling.

Meanwhile, if the traveling distance is smaller than or equal to the first distance d1, the robot cleaner may continuously travel along the predetermined traveling pattern to perform cleaning.

Successively, the robot cleaner may determine whether the selected cell has been completely cleaned based on information about a traveling trajectory and the size of the selected cell (347), and if it is determined that the selected cell has been completely cleaned, the robot cleaner may move to the next cell and may clean the next cell.

In one or more embodiments, distance data about the first and second distances may be used in order to remove dust between the blade 141 and the main brush 132, however, time data may also be used.

For example, the robot cleaner may measure a traveling time, compare the measured traveling time to a first time, and reverse by a second time if it is determined that the measured traveling time has exceeded the first time.

As such, by removing dust remaining between the blade 141 and the main brush 132 through reverse-traveling, it is possible to prevent failure in the robot cleaner.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A robot cleaner comprising:
a main body;
a traveling unit moving the main body; and
a controller controlling the traveling unit such that the robot cleaner travels from a first straight path to a first rotation path having a first rotation direction, from the first rotation path to a second straight path intersecting the first straight path, from the second straight path to a second rotation path having a second rotation direction opposite to the first rotation direction of the first rotation path, and from the second rotation path to a third straight path intersecting the second straight path.

2. The robot cleaner according to claim 1, wherein the controller controls the traveling unit such that the robot cleaner repeatedly travels along a traveling pattern in which the first straight path, the first rotation path, the second straight path, and the second rotation path are sequentially connected to each other.

3. The robot cleaner according to claim 2, further comprising:
an input unit receiving a selection of a cleaning mode among a plurality of cleaning modes; and
a storage unit storing size information about a plurality of traveling patterns respectively corresponding to the plurality of cleaning modes,
wherein the controller checks size information about a traveling pattern corresponding to the selected cleaning mode, generates the traveling pattern based on the size information about the traveling pattern, and controls driving of the traveling unit based on the generated traveling pattern.

4. The robot cleaner according to claim 3, wherein the size information about the traveling pattern includes a pattern length of the traveling pattern, and a pitch length between a plurality of pitch points of neighboring traveling patterns.

5. The robot cleaner according to claim 2, further comprising an obstacle detector detecting an obstacle, wherein the controller determines a distance to the obstacle based on an obstacle detection signal, and regenerates a traveling pattern based on the determined distance to the obstacle.

6. The robot cleaner according to claim 2, wherein the controller measures a traveling distance when the robot cleaner repeatedly travels along the traveling pattern, compares the measured traveling distance to a first distance, and controls the traveling unit to reverse the robot cleaner by a second distance when the measured traveling distance is greater than the first distance.

7. The robot cleaner according to claim 1, further comprising:
a brush unit; and
a torque detector detecting a torque applied to the brush unit,
wherein the controller controls the traveling unit to reverse the robot cleaner by a predetermined distance when the detected torque is greater than a predetermined reference value.

8. The robot cleaner according to claim 7, further comprising:
a main brush installed in the brush unit; and
a blade positioned at a predetermined angle with respect to a rotating shaft of the main brush.

9. A robot cleaner comprising:
a main body;
a traveling unit moving the main body; and
a controller controlling the traveling unit such that the robot cleaner travels along a traveling pattern including a first straight path extending in a first direction, and a second straight path extending from an end point of the first straight path in a second direction making a first angle with the first straight path, the first angle being greater than 0 degrees and less than 90 degrees.

10. The robot cleaner according to claim 9, wherein neighboring traveling patterns make the first angle with each other.

11. The robot cleaner according to claim 10, wherein the controller controls the traveling unit such that the robot cleaner repeatedly travels along the traveling pattern, in such a manner to rotate the traveling unit to a second angle at a point at which a first traveling has been completed to move the robot cleaner along a straight line by a predetermined distance in an opposite direction, and then to perform a second traveling along the traveling pattern.

12. The robot cleaner according to claim 9, further comprising:
an input unit receiving a selection of a cleaning mode among a plurality of cleaning modes; and
a storage unit storing size information about a plurality of traveling patterns respectively corresponding to the plurality of cleaning modes, wherein the controller checks the size information about a traveling pattern corresponding to the selected cleaning mode, generates a traveling pattern based on the size information about the traveling pattern, and controls driving of the traveling unit based on the generated traveling pattern.

13. The robot cleaner according to claim 12, wherein the size information about the traveling pattern includes a pattern length of the traveling pattern, and a pitch length between pitch points of neighboring traveling patterns.

14. The robot cleaner according to claim 9, further comprising an obstacle detector detecting an obstacle, wherein the controller determines a distance to the obstacle based on an obstacle detection signal, and regenerates a traveling pattern based on the determined distance to the obstacle.

15. The robot cleaner according to claim 9, wherein the controller measures a traveling distance when the robot cleaner repeatedly travels along the traveling pattern, compares the measured traveling distance to a first distance, and controls the traveling unit to reverse the robot cleaner by a second distance when the measured traveling distance is greater than the first distance.

16. The robot cleaner according to claim 9, further comprising:
a brush unit; and
a torque detector detecting a torque applied to the brush, wherein the controller controls the traveling unit to reverse the robot cleaner by a predetermined distance when the detected torque is greater than a predetermined reference value.

17. A robot cleaner comprising:
a main body;
a traveling unit moving the main body; and
a controller controlling the traveling unit such that the robot cleaner repeatedly travels along "Figure 8"-shaped traveling patterns successively arranged at regular intervals.

18. A control method of a robot cleaner, comprising:
checking information about a predetermined traveling pattern;
determining a traveling trajectory based on a traveling speed;
generating a traveling pattern based on the determined traveling trajectory and the information about the predetermined traveling pattern, wherein the traveling pattern includes a first straight path, a first rotation path having a first rotation direction and connected to the first straight path, a second straight path connected to the first rotation path and intersecting the first straight path, a second rotation path connected to the second straight path and having a second rotation direction opposite to the first rotation direction, and a third straight path connected to the second rotation path and intersecting the second straight path; and
controlling the robot cleaner to travel along the generated traveling pattern.

19. The control method according to claim 18, wherein the traveling along the generated traveling pattern comprises repeatedly traveling along a traveling pattern in which the first straight path, the first rotation path, the second straight path, and the second rotation path are sequentially connected to each other.

20. The control method according to claim 19, further comprising:
detecting an obstacle; and
determining a distance to the obstacle, and regenerating a traveling pattern based on the determined distance to the obstacle.

21. The control method according to claim 20, wherein the regenerating of the traveling pattern comprises generating a rotation path before a collision with the obstacle.

22. The control method according to claim 18, wherein the generating of the traveling pattern further comprises:
checking a cleaning mode selected through an input unit;
checking size information about a traveling pattern corresponding to the selected cleaning mode; and
generating the traveling pattern based on the size information about the traveling pattern.

23. The control method according to claim 18, further comprising:
measuring a traveling distance;
comparing the traveling distance to a first distance; and
reversing the robot cleaner by a second distance when the measured traveling distance is greater than the first distance.

24. The control method according to claim 18, further comprising:
detecting a torque applied to a brush unit; and
reversing the robot cleaner by a predetermined distance when the detected torque is greater than a predetermined reference value.

25. A control method of a robot cleaner, comprising:
checking information about a predetermined traveling pattern;
determining a traveling trajectory based on a traveling speed;
generating a traveling pattern based on the determined traveling trajectory and the information about the predetermined traveling pattern, wherein the traveling pattern includes a first straight path extending in a first direction and a second straight path extending from an end point of the first straight path in a second direction making a first angle with the first straight path, the first angle being greater than 0 degrees and less than 90 degrees; and
repeatedly traveling along the generated traveling pattern at regular intervals while maintaining the first angle between two traveling patterns.

26. The control method according to claim 25, further comprising:
performing first traveling of repeatedly traveling along the traveling pattern;
rotating the robot cleaner to a second angle at a point at which the first traveling has been completed, and moving the robot cleaner along a straight line by a predetermined distance in an opposite direction of the traveling direction; and
performing second traveling of traveling about a cell along the traveling pattern, starting from a point at which the moving along a straight line has been completed.

27. The control method according to claim 25, wherein the generating of the traveling pattern further comprises:
checking a cleaning mode selected through an input unit; and
adjusting at least one of a pattern length and a pitch length based on pattern information corresponding to the selected cleaning mode.

28. The control method according to claim 25, wherein the generating of the traveling pattern further comprises:
detecting an obstacle; and
determining a distance to the obstacle to adjust a pattern length of the traveling pattern.

29. A control method of a robot cleaner, comprising:
generating a traveling pattern, wherein the traveling pattern includes a first straight path, a first rotation path having a first rotation direction and connected to the first straight path, a second straight path connected to the first rotation path and intersecting the first straight path, a second rotation path connected to the second straight path and having a second rotation direction opposite to the first rotation direction, and a third straight path connected to the second rotation path and intersecting the second straight path; and
controlling the robot cleaner to travel along the generated traveling pattern.

30. The control method according to claim 29, further comprising:
detecting an obstacle; and
determining a distance to the obstacle, and regenerating a traveling pattern based on the determined distance to the obstacle.

31. The control method according to claim 29, wherein the generating of the traveling pattern further comprises:
checking a cleaning mode selected through an input unit;
checking size information about a traveling pattern corresponding to the selected cleaning mode; and
generating the traveling pattern based on the size information about the traveling pattern.

32. The control method according to claim 29, further comprising:
measuring a traveling distance;
comparing the traveling distance to a first distance; and
reversing the robot cleaner by a second distance when the measured traveling distance is greater than the first distance.

33. The control method according to claim 29, further comprising:
detecting a torque applied to a brush unit; and
reversing the robot cleaner by a predetermined distance when the detected torque is greater than a predetermined reference value.

* * * * *